United States Patent
Amako

(10) Patent No.: US 7,157,661 B2
(45) Date of Patent: Jan. 2, 2007

(54) METHOD AND APPARATUS FOR LASER MACHINING

(75) Inventor: Jun Amako, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/187,027

(22) Filed: Jul. 22, 2005

(65) Prior Publication Data

US 2006/0054606 A1    Mar. 16, 2006

(30) Foreign Application Priority Data

Sep. 15, 2004    (JP) .............................. 2004-268784

(51) Int. Cl.
*B23K 26/067*    (2006.01)
(52) U.S. Cl. ................................. 219/121.73
(58) Field of Classification Search ................ 359/559, 359/560, 563; 219/121.65, 121.66, 121.73
See application file for complete search history.

(56) References Cited

U.S. PATENT DOCUMENTS

| | | | |
|---|---|---|---|
| 5,864,430 A * | 1/1999 | Dickey et al. .............. | 359/559 |
| 6,008,914 A * | 12/1999 | Sasagawa et al. ........... | 359/559 |
| 6,252,714 B1 * | 6/2001 | Guenther et al. ........... | 359/559 |
| 6,943,086 B1 * | 9/2005 | Hongo et al. .......... | 219/121.76 |
| 2003/0132209 A1 * | 7/2003 | Kawaguchi et al. ... | 219/121.73 |
| 2003/0141287 A1 * | 7/2003 | Tanaka et al. ......... | 219/121.73 |
| 2004/0155019 A1 * | 8/2004 | Tanaka ................... | 219/121.75 |

FOREIGN PATENT DOCUMENTS

JP          A 8-33993          2/1996

OTHER PUBLICATIONS

Amako et al., "An Iteratively-Designed Binary Phase Grating for Flattop Beam Generation," Optical Review, vol. 2, No. 5, pp. 339-346, 1995.
Veldkamp, "Laser beam profile shaping with interlaced binary diffraction gratings," Applied Optics, vol. 21, No. 17, pp. 3209-3212, Sep. 1982.

* cited by examiner

*Primary Examiner*—Geoffrey S. Evans
(74) *Attorney, Agent, or Firm*—Oliff & Berridge, PLC

(57) ABSTRACT

A laser-machining method is provided in which a laser beam is generated with an energy intensity distribution that is a Gaussian distribution. The laser beam is shaped by applying a phase modulation based on a phase distribution expressed by a first order function having a negative gradient, then by applying a phase modulation based on a phase distribution expressed by an n-th order function having a positive gradient (n is a natural number no less than 2), and the laser beam, whose energy intensity distribution has been made substantially flat through the above processes, is led to irradiate a machined body, thereby machining the machined body.

12 Claims, 6 Drawing Sheets

METHOD AND APPARATUS FOR LASER MACHINING

This application claims the benefit of Japanese Patent Application No. 2004-268784, filed Sep. 15, 2004. The entire disclosure of the prior application is hereby incorporated by reference herein in its entirety.

BACKGROUND

The present invention relates to a method and devices for machining various materials using a laser beam.

As the reduction in size (miniaturization, high-definition, or the like) of various products progresses, the demand for a high definition and high precision machining technique is mounting. Moreover, the manufacturing processes have been diversified along with the transition of products market trends and the variety of materials used there is also expanding. With such diversified demands, it is becoming challenging to manage them with conventional techniques, such as mechanical machining and photolithography. Today laser-machining technique is looked on as powerful means to meet such demands finding a number of applications in broad industrial fields.

In laser-machining, when using a laser beam whose energy intensity distribution is a Gaussian distribution, there will be differences in the machining conditions of the material due to the non-uniformity of the energy intensity between the center of the beam and the periphery (in the outer side) thereof, thus a uniform machining hardly takes place. In order to avoid such an inconvenience, the process margin for the irradiating condition of the laser beam will be narrowed, and thus manufacturing process will be unreliable, or the option for the materials to serve as a machined object will be restricted significantly. On the other hand, it is known that the quality of the machining can be improved by adopting a laser beam whose energy intensity distribution is made to be an almost flat distribution (a top hat distribution) (For example, refer to the following Patent Document).

Japanese Unexamined Patent Publication No. H8-33993 is an example of the related art.

In the laser-machining using the above-described conventional technique, the energy intensity distribution of the laser beam is shaped into a top hat-like shape by letting the vicinity of the peak intensity of the laser beam partially pass through an amplitude mask. For this reason, some part of the laser beam outputted from a laser oscillator results in being truncated, and thus the efficiency in use of light is low. Moreover, in the conventional technique described above, the diffracted beams with the orders of a limited range (for example, up to ±3rd order) are imaged by letting the laser beam pass through an aperture of the mask, and thereby the top hat-like energy intensity distribution is realized. For this beam-shaping mechanism some ripples will occur in the distribution due to the truncation of the diffracted beams with higher orders, and thus the uniformity of the energy intensity distribution of the shaped laser beam is not sufficient.

An advantage of the invention is to provide a technique allowing for a significant improvement of the efficiency in use of light when machining with a laser beam having a top hat intensity distribution.

Another advantage of the invention is to provide a technique enabling improvement of the uniformity in the energy intensity distribution of the laser beam when machining with a laser beam having a top hat intensity distribution.

SUMMARY

According to a first aspect of the invention, a laser-machining method includes: a first process in which a laser beam whose energy intensity distribution is a Gaussian distribution is generated; a second process in which the laser beam is shaped by applying a phase modulation based on a phase distribution expressed by a first order function having a negative gradient, the position in the direction of the beam diameter being the variable, with respect to the wavefront of the laser beam, so that the phase will relatively lead as coming closer to the center thereof and the phase will relatively lag as coming away from the center; a third process in which the laser beam is shaped by applying a phase modulation based on a phase distribution expressed by an n-th order function having a positive gradient (n is a natural number no less than 2), the position in the direction of the beam diameter being the variable, with respect to the wavefront of the laser beam that has been shaped through the second process, so that the phase will relatively lag as coming closer to the center thereof and the phase will relatively lead as coming away from the center; and a fourth process in which the laser beam, whose energy intensity distribution has been made substantially flat through the second and third process, is irradiated to a machined body, thereby machining the machined body. Here, the "machining" in this specification refers to causing the machined body some physical changes due to the irradiation of laser beams. The machining means, for example, cutting (etching), drilling, texturing, joining, polymerization, and exposure to photosensitive film or the like.

In the invention, since a laser beam having a top hat distribution is generated by giving a predetermined phase modulation to the laser beam with a Gaussian distribution, no or little part of the laser beam will be truncated, in theory. Accordingly, it is possible to attain a high efficiency in use of light when carrying out the laser-machining. Moreover, in the invention, since there is no error-generating factor caused from the theoretical truncation, the uniformity of the energy intensity distribution of the shaped laser beam can be improved further.

It is preferable that the phase modulation in the second process be carried out using a diffractive optical element.

With the use of the diffractive optical element, the phase modulation in the second process can be realized easily and at a low cost.

It is preferable that the above-described phase modulation in the third process be carried out using a focusing lens.

With the use of the focusing lens, the phase modulation in the third process can be realized easily and at a low cost.

It is also preferable that the laser-machining method further include a fifth process in which the laser beam having gone through the second process is split into multiple beams, wherein in the fourth process each of the multiple laser beams is led to irradiate the machined body, thereby machining multiple places of the machined body substantially simultaneously.

Accordingly, multiple places can be machined concurrently, and thus the throughput in the manufacturing can be improved. In the invention, in particular, the efficiency in use of light is high, i.e. there is no or little energy loss, and it is therefore possible to split the laser beam into as many beams as possible.

It is preferable that the splitting of the laser beam in the fifth process be carried out using a diffractive beam splitter.

With the use of the diffractive beam splitter, the splitting of the laser light beam in the fifth process can be realized easily and at a lower cost.

It is further preferable that the diffractive beam splitter includes the function of carrying out the phase modulation in the second process.

This enables devices and instruments used for implementation of the method concerning the invention to be simplified further.

A second aspect of the invention relates to a device suitably used for implementation of the method concerning the above first aspect of the invention. According to the second aspect of the invention, a laser-machining device include: a laser light source for generating a laser beam whose energy intensity distribution is a Gaussian distribution; a first optical element arranged in the path of the laser beam, that shapes the laser beam by applying a phase modulation based on a phase distribution expressed by a first order function having a negative gradient, the position in the direction of the beam diameter being the variable, with respect to the wavefront of the laser beam, so that the phase will relatively lead as coming closer to the center thereof and the phase will relatively lag as coming away from the center, a second optical element arranged in the path of the laser beam that has been shaped by the first optical element, that shapes the laser beam by applying a phase modulation based on a phase distribution expressed by an n-th order function having a positive gradient (n is a natural number no less than 2), the position in the direction of the beam diameter being the variable, with respect to the wavefront of the laser beam, so that the phase will relatively lag as coming closer to the center thereof and the phase will relatively lead as coming away from the center; and a positioning means that adjusts the relative arrangement of the machined body so that the laser beam that has been shaped by the first and second optical elements and whose energy intensity distribution has been made substantially flat is led to irradiate a predetermined position of the machined body.

According to such a configuration, it is possible to attain a high efficiency in use of light when carrying out the laser-machining. Moreover, it is possible to further improve the uniformity of the energy intensity distribution of the laser beam in carrying out the laser-machining.

It is preferable that the first optical element described above be realized as, for example, a diffractive optical element.

This enables the configuration of the laser-machining device to be simplified further and to be made at a low cost.

It is preferable that the second optical element described above be realized as, for example, a focusing lens.

This enables the configuration of the laser-machining device to be simplified further and to be made at a low cost.

It is also preferable that the laser-machining device further include a third optical element that splits the laser beam, which has been shaped by the first optical element, into multiple beams, wherein each of the multiple laser beams is led to irradiate the machined body, thereby machining multiple places of the machined body substantially simultaneously.

Accordingly, multiple places can be machined concurrently, enabling the throughput in the manufacturing to be improved. In the invention, in particular, the efficiency in use of light is high, i.e. there is no or little energy loss, and it is therefore possible to split the laser beam into as many beams as possible.

It is preferable that the third optical element described above be realized with, for example, a diffractive beam splitter.

This enables the configuration of the laser-machining device to be simplified further and to be made at a low-cost.

Moreover, it is also preferable that the diffractive beam splitter includes the function of the first optical element described above.

This enables the laser-machining device to be simplified.

According to a third aspect of the invention, an electronic apparatus includes a machined body, which is manufactured using the machining method concerning the first aspect of the invention or which is manufactured using the laser-machining device concerning the second aspect of the invention. Here, there is no restriction in particular to the type of "machined body", and various ones can be conceivable, however, a transparent electric conduction film that is formed on a substrate, such as glass, is listed, for example. Conductive films have various applications, such as component parts of a liquid crystal display device.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Hereinafter, the embodiments of the invention will be described with reference to the accompanying drawings.

First Embodiment

Figure 1:
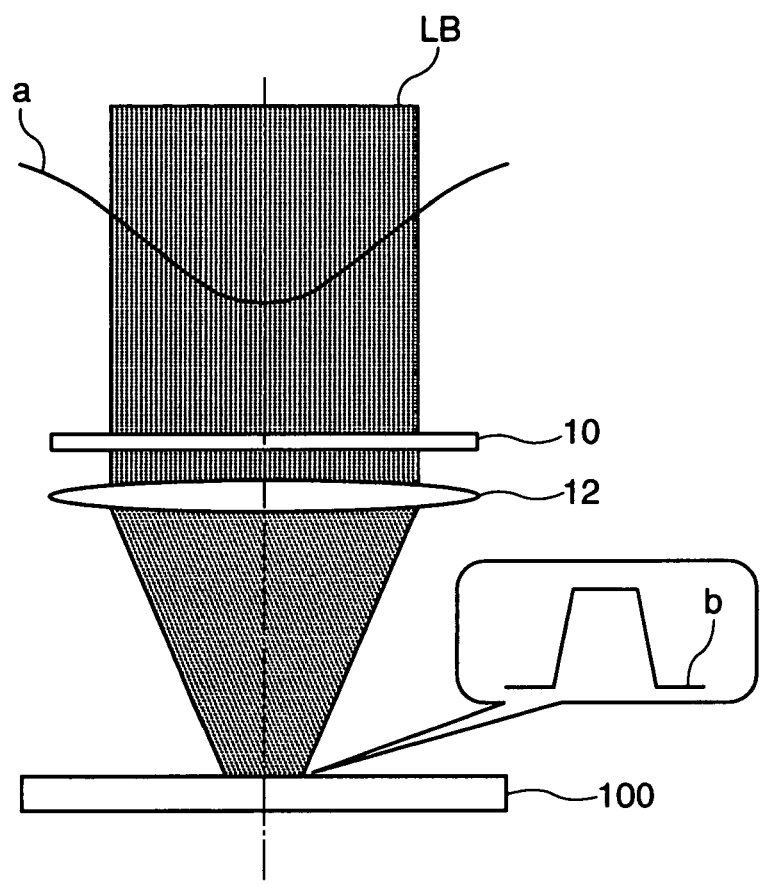
FIG. 1 is a schematic view explaining a laser-machining method concerning a first embodiment.
Figure 2:
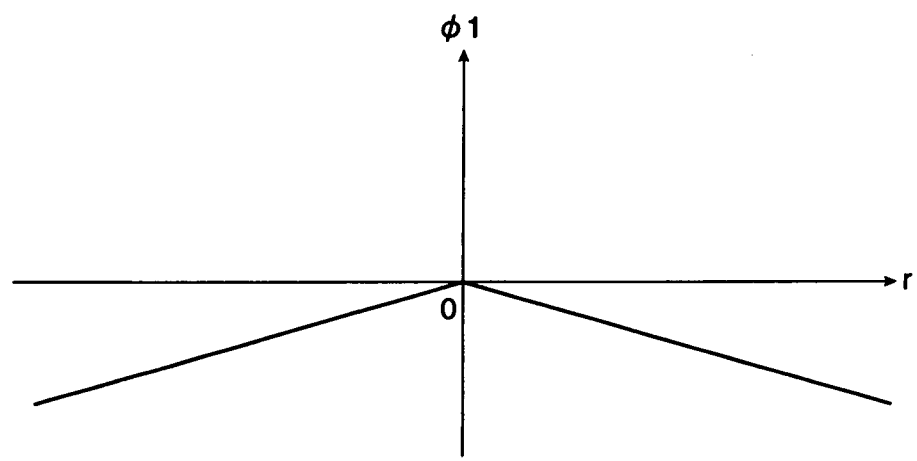
FIG. 2 is a view explaining an example of a phase modulation in a second process.

FIG. 1 is a schematic view explaining a laser-machining method concerning a first embodiment. As shown in FIG. 1, first, a laser beam LB whose energy intensity distribution is a Gaussian distributions (refer to a numeral a) is generated using a laser oscillator or the like (a first process). Then, the laser beam LB is shaped by applying a predetermined phase modulation to the wavefront of the laser beam LB, so that the phase will relatively lead as coming closer to the center thereof and the phase will relatively lag as coming away from the center (a second process). The phase modulation in the second process can be realized using a first optical element 10 composed of a diffractive optical element or the like FIG. 2 is a view explaining an example of the phase modulation in the second process. As shown in FIG. 2, in the embodiment, a phase modulation based on a phase distribution expressed by a first order function having a negative gradient, the position in the direction of the beam diameter being the variable r, is applied to the laser beam LB. The first order function, with which a phase distribution φ1 as illustrated is obtained, is expressed, for example, with the following equation (1). Provided that P1 is the period of the first order function.

$$\phi 1 = -2\pi r/P1 \tag{1}$$

Here, the laser beam LB having gone through the respective process described above, for example, if the gradient of the function φ1 is adequately large, will turn out to be in a ring-like shape when it has propagated sufficiently far away. The radius Δ of this ring is expressed by the following equation (2). Provided that λ is the wavelength of the laser beam LB and f is the focusing distance.

$$\Delta = \lambda f/P1 \tag{2}$$

Then, the laser beam LB is shaped by applying a predetermined phase modulation to the wavefront of the laser beam LB that has been shaped through the second process, so that the phase will relatively lag as coming closer to the center thereof and the phase will relatively lead as coming away from the center (a third process). The phase modulation in this third process can be realized using a second optical element 12 composed of a focusing lens or the like.

Figure 3:
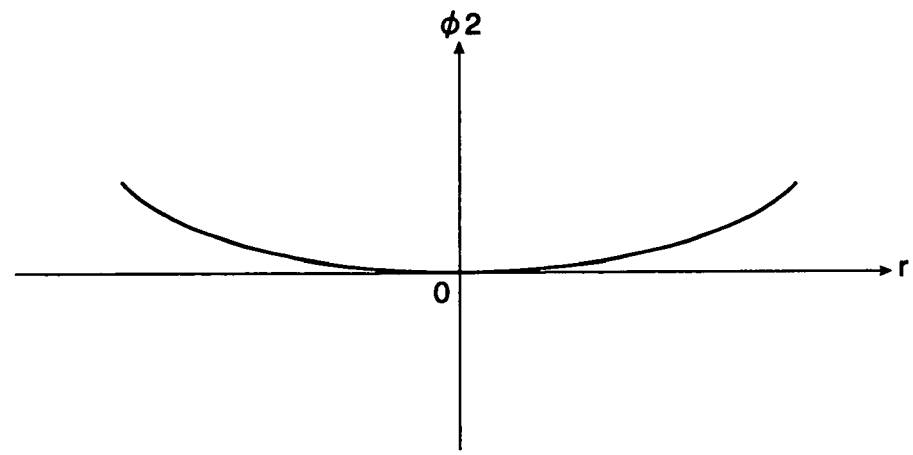
FIG. 3 is a view explaining an example of a phase modulation in a third process.

FIG. 3 is a view explaining an example of the phase modulation in a third process. As shown in FIG. 3, in the embodiment, a phase modulation based on a phase distribution expressed by an n-th order function having a positive gradient (n is a natural number no less than 2), the position in the direction of the beam diameter being the variable r, is applied to the laser beam LB. The n-th order function, with which the distribution of a phase φ2 as illustrated is obtained, is expressed by the following equation (3), for example.

$$\phi 2 = \pi r^2/(\lambda f) \tag{3}$$

Here, the diameter w of the laser beam focused with the second optical element 12 is expressed by the following equation (4). Provided that D is the diameter of the laser beam incident upon the second optical element 12.

$$w = 2.44 \lambda f/D \tag{4}$$

Accordingly, if the radius Δ of the ring of the laser beam LB expressed by the equation (2) is set so as to satisfy the relationship of the following equation (5), the energy intensity distribution of the laser beam LB can be made to be a substantially flat distribution (a top hat distribution: refer to a numeral b). Provided that a is a coefficient which can be arbitrarily set in order to determine the uniformity of the energy intensity distribution, and is set to on the order of 0.50, for example.

$$\Delta < \alpha w \tag{5}$$

The laser beam LB whose energy intensity distribution has been shaped into a substantially flat distribution through such each process is led to irradiate a machined body 100, thereby machining the machined body 100 (a fourth process). Here, the "machining" refers to causing the machined body 100 some physical changes due to the irradiation of the laser beam as described above.

Next, a configuration example of a laser-machining device suitable for the laser-machining method of the embodiment will be described.

Figure 4:
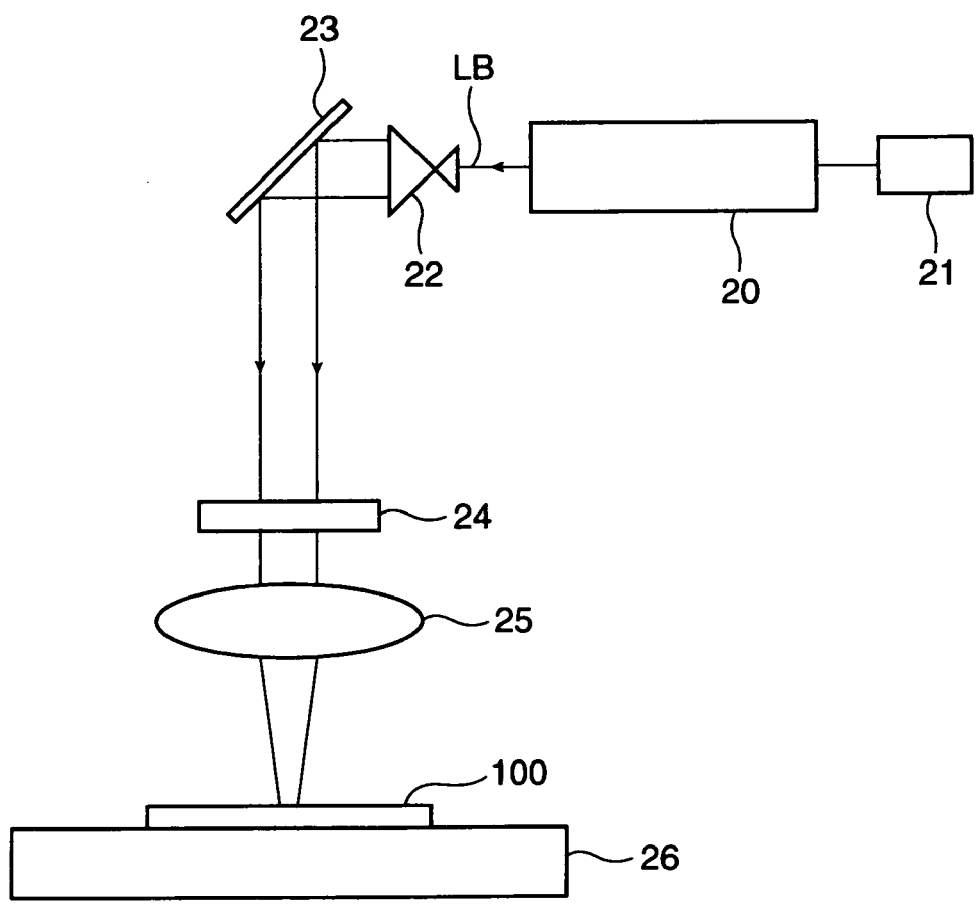
FIG. 4 is a view explaining a configuration of a laser-machining device of an embodiment.

FIG. 4 is a view explaining the configuration of the laser-machining device according to an embodiment. The laser-machining device shown in FIG. 4 includes a laser light source 20, a Q-switch driver 21, an expander collimator 22, a mirror 23, a diffractive optical element (a first optical element) 24, a focusing lens (a second optical element) 25, and a stage (positioning means) 26.

The laser light source 20 generates a laser beam whose energy intensity distribution is a Gaussian distribution. As for such a laser light source 20, various kinds of laser oscillators are used suitably. As an example, in the embodiment, a pulse YAG laser with a Q switch control (a wavelength of 532 nm, an average output on the order of 5 W, Q switch frequency on the order of 1 kHz) is used as the laser light source 20. The Q switch frequency of the laser light source 20 is controlled with the Q switch driver 21.

The expander collimator 22 expands the beam diameter of the laser beam LB (the beam diameter of approximately 1 mm, for example) emitted from the laser light source 20. The path of the laser beam LB that has been expanded with the expander collimator 22 is folded with the mirror 23.

A diffractive optical element 24 is arranged in the path of the laser beam LB whose path has been folded with the mirror 23, and shapes the laser beam LB, by applying a predetermined phase modulation to the wavefront of the laser beam LB, so that the phase will relatively lead as coming closer to the center thereof and the phase will relatively lag as coming away from the center. Specifically, the diffractive optical element 24 applies the phase modulation based on a phase distribution expressed by a first order function having a negative gradient, the position in the direction of the beam diameter being the variable (refer to FIG. 2).

A focusing lens 25 is arranged in the path of the laser beam LB that has been shaped with the diffractive optical element 24, and shapes the laser beam LB, by applying a predetermined phase modulation to the wavefront of the laser beam LB, so that the phase will relatively lag as coming closer to the center thereof and the phase will relatively lead as coming away from the center. Specifically, the focusing lens 25 applies the phase modulation based on a phase distribution expressed by an n-th order function having a positive gradient (n is a natural number no less than 2), the position in the direction of the beam diameter being the variable (refer to FIG. 3).

A stage 26 supports the machined body 100, and adjusts the relative arrangement of the machined body 100 and the laser beam LB so that the laser beam LB, which has been shaped with the diffractive optical element 24 and the focusing lens 25 and whose energy intensity distribution has been made to be a substantially flat distribution, is irradiated to a predetermined position of the machined body 100.

Figure 5:
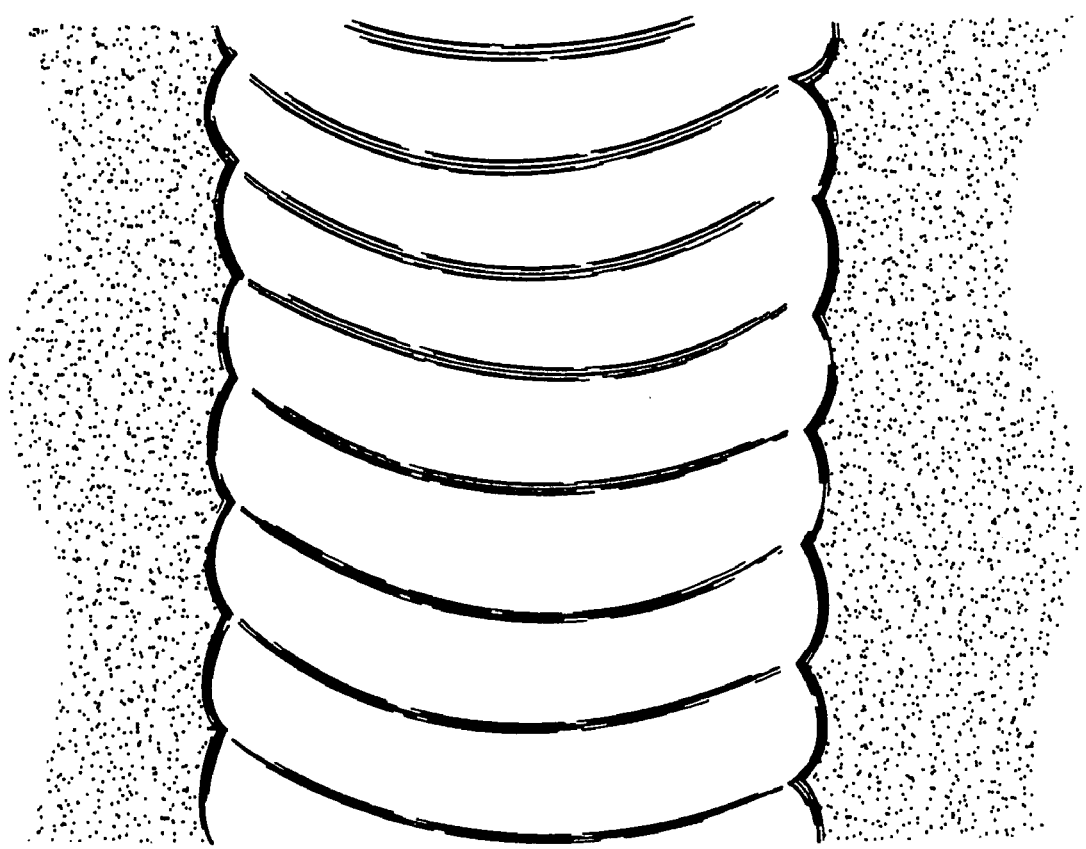
FIG. 5 is a view explaining an example of a machined body.
Figure 6:
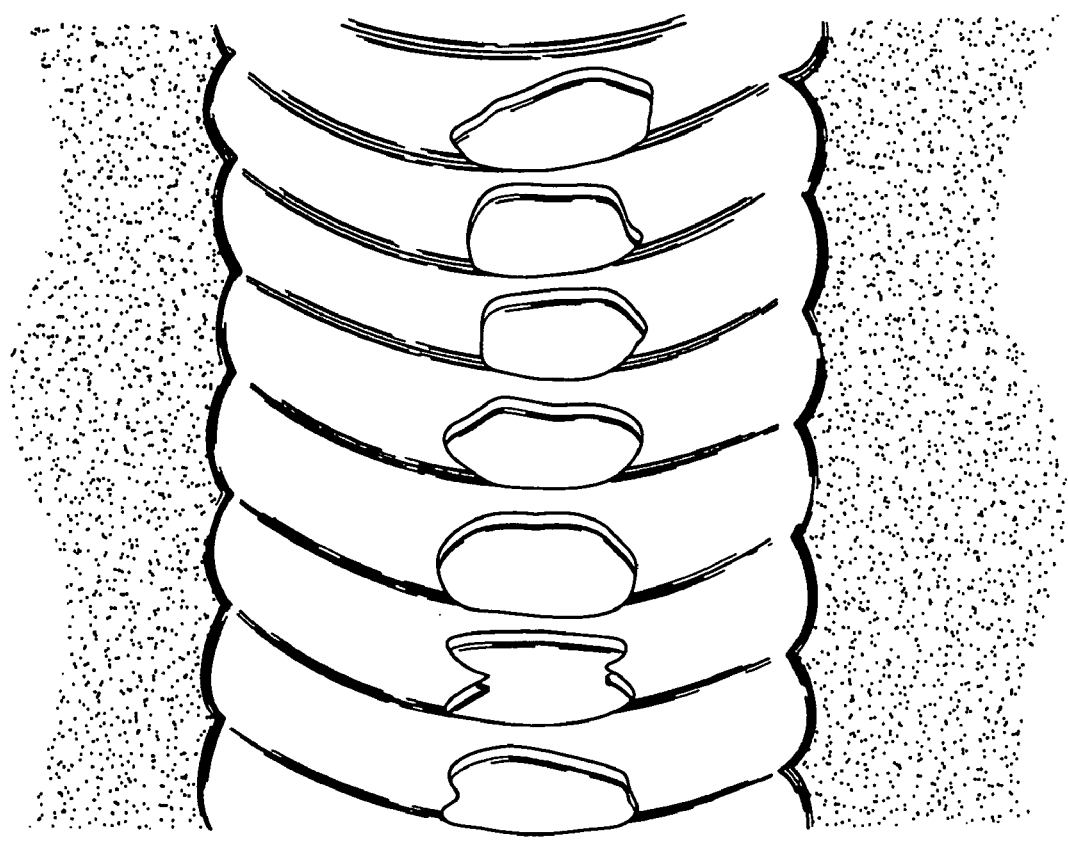
FIG. 6 is a view showing a comparison example of the machined body.

FIG. 5 is a view explaining an example of the machined body that has been machined with the laser-machining device, and schematically shows the situation in the case where an ITO (Indium Tin Oxide) film on a glass substrate has been laser-etched. Moreover, FIG. 6 is a view showing a comparison example of the machined body, and schematically shows the situation in the case where the same machining as the above (laser-etching) has been carried out with a laser beam with a Gaussian distribution. As shown in FIG. 5, with the use of the laser beam having a top hat-like (trapezoidal shape) energy intensity distribution, it is possible to remove the ITO film uniformly along the cutting lines without giving an unwanted damage to a lower glass substrate. On the other hand, as shown in FIG. 6, if a laser beam with a Gaussian distribution is used, it is necessary to raise the entire intensity of the laser beam in order to remove the ITO with a required width, and thus such an inconvenience occurs that an area of the glass substrate corresponding to the center of the beam is also ablated due to the Gaussian intensity distribution of the beam.

Second Embodiment

Although in the first embodiment described above, there has been described about the case where a single laser beam having a top hat-like energy intensity distribution is generated, it is also possible to split the laser beam into multiple beams, thereby carrying out the machining. Hereinafter, this multi-beam processing case will be described. In addition, what has already been described in the first embodiment will not necessarily be reiterated.

Figure 7:
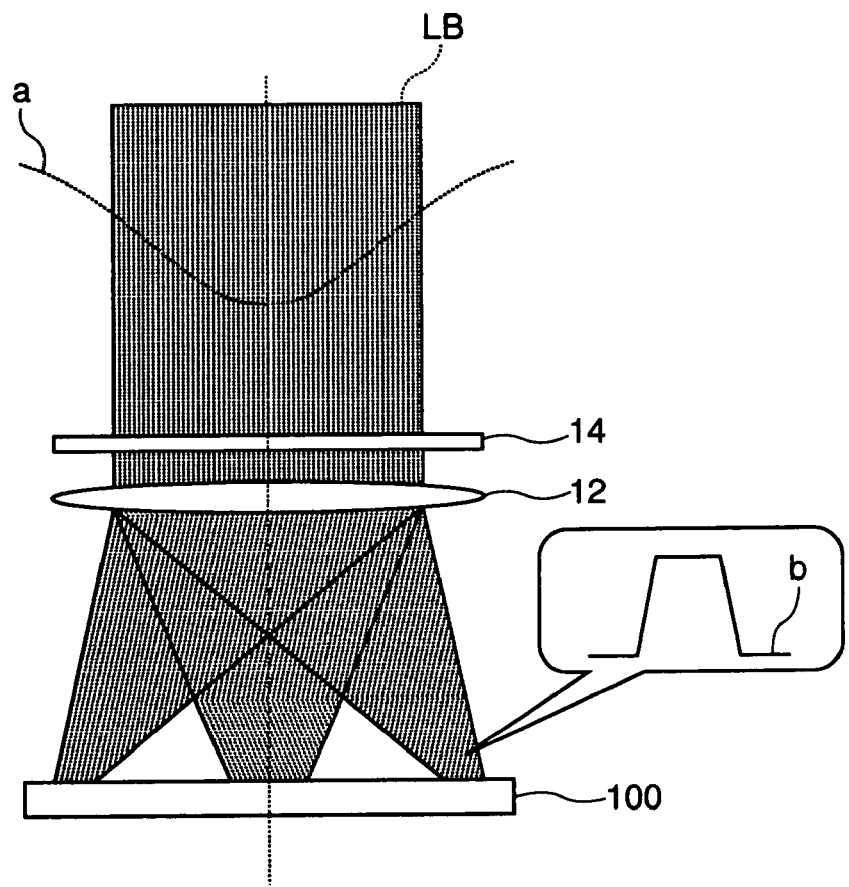
FIG. 7 is a schematic view explaining a laser-machining method concerning a second embodiment.

FIG. 7 is a schematic view explaining a laser-machining method concerning a second embodiment. In the manner similar to that of the first embodiment described above, the laser beam LB with a Gaussian distribution (refer to a numeral a) is generated (a first process), and a predetermined phase modulation is applied to the wave face of the laser beam LB (a second process).

Next, the laser beam which has gone through the respective process is split into multiple beams (a fifth process.) The beam-splitting in this fifth process can be realized, for example, using a diffractive beam splitter 14. Moreover, it is also possible that the phase modulation function (the beam-shaping function) and the beam-splitting function in the second process may be integrated into this diffractive beam splitter 14, thereby combining the both functions. In FIG. 7, a case where both functions are integrated into the diffractive beam splitter is shown.

Here, if the phase function of the beam-shaping function is denoted by $\phi 1$ (refer to the above equation (1)) and the phase function of the beam-splitting function is denoted by $\phi 3$, then the phase function to be recorded on the diffractive beam splitter will be $\phi 1+\phi 3$.

In addition, if the beam focusing function in the third process is also superimposed on the diffractive beam splitter, the phase function to be recorded on the diffractive beam splitter will be $\phi 1+\phi 2+\phi 3$.

In either case, an intensity distribution of the diffracted light pattern given by the following equation I(x) will be obtained on the machined body. Provided that "F( )" denotes a Fourier transform.

$$I(X)=|F(\phi 1+\phi 2+\phi 3)|^2 \quad (6)$$

Figure 8:
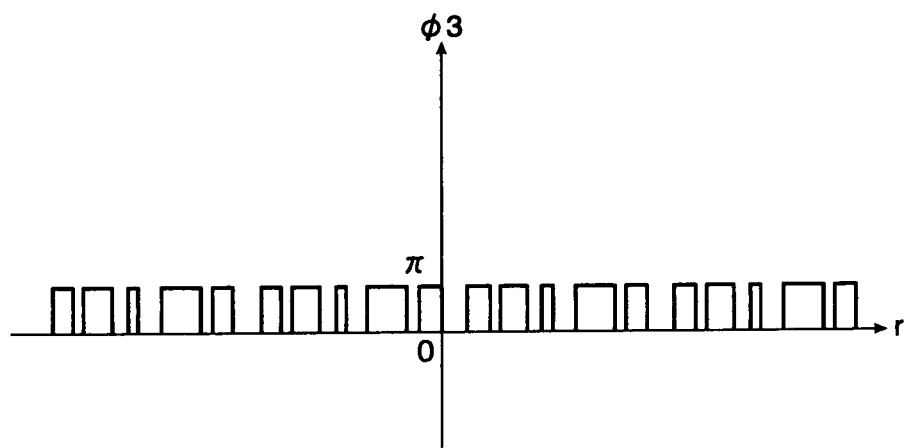
FIG. 8 is a view explaining an example of a phase distribution φ3 of a beam-branching function.

FIG. 8 is a view explaining an example of the phase distribution $\phi 3$ of the beam-splitting function, which the diffractive beam splitter is supposed to have. As shown in FIG. 8, the phase function $\phi 3$ is a phase distribution with a period of P2 having a predetermined pattern whose phase becomes 0 or $\pi$. The phase distribution across four periods is shown in FIG. 8. Here, if the period P1 of the phase function $\phi 1$ is compared with the period P2 of the phase function $\phi 3$, there is a relationship of P1>>P2. In addition, the phase function $\phi 3$ is designed using a stochastically iterative algorithm.

Next, a predetermined phase modulation is applied to each of the multiple laser beams (a third process). Thus, the multiple laser beams whose energy intensity distribution has become a substantially flat distribution (refer to a numeral b) are obtained. Then, multiple places of the machined body are machined substantially simultaneously by irradiating each of the multiple laser beams to the machined body 100 (a fourth process). In the embodiment, since the efficiency in use of light is high, i.e. there is no or little energy loss, it is possible to split the laser beam into as many beams as possible, thereby machining many places in parallel.

In addition, the configuration example of the laser-machining device suitable for the laser-machining method of the embodiment is almost the same as that of the case of the first embodiment described above as shown in FIG. 4, and the only difference is in that the diffractive optical element 24 is replaced with the diffractive beam splitter. Therefore, the configuration example of the laser-machining device concerning the second embodiment is omitted.

The laser-machining method and laser-machining device concerning each embodiment described above can be applied to various applications, and are suitable for the machining of transparent electrodes (patterning repairing, or the like) in manufacturing liquid crystal display devices, for example. Hereinafter, electronic apparatus including the liquid crystal display device, which is manufactured by applying the laser-machining method and laser-machining device of the embodiment, will be exemplified.

Figure 9A:
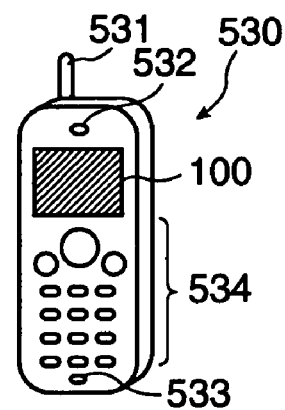
FIG. 9 is a view explaining specific examples of electronic apparatus.
Figure 9B:
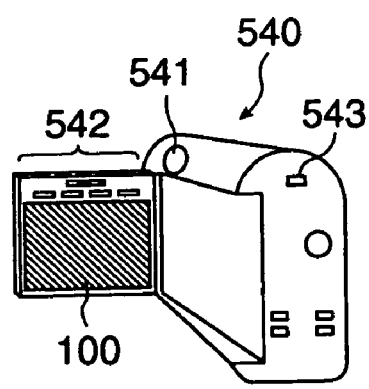

FIG. 9 shows views explaining specific examples of the electronic apparatus. FIG. 9 A is an example of application to a cellular phone, and a cellular phone 530 includes an antenna section 531, a voice output section 532, a voice input section 533, an operating section 534, and a liquid crystal display device 100 into which the machined body (the transparent electrode) concerning the embodiment is incorporated. FIG. 9B is an example of application to a video camera, and a video camera 540 includes a image receiver 541, an operating section 542, a voice input section 543, and the liquid crystal display 100 into which the machined body (the transparent electrode) concerning the embodiment is incorporated. Moreover, the electronic apparatus is not restricted to these, and other than these, for example, a facsimile with a display, a digital camera with a finder, a portable type TV, an electronic notebook, or the like are also represented.

Thus, according to each embodiment described above, since a laser beam having a top hat distribution is generated by giving a predetermined phase modulation to the laser beam with a Gaussian distribution, no or little part of the laser beam will be truncated in theory. Accordingly, it is possible to attain a high efficiency in use of light when carrying out the laser-machining.

Moreover, according to the embodiments, since there are no error-generating factors caused from the theoretical truncation of higher-order diffractions of light, it is possible to further improve the uniformity of the energy intensity distribution of the shaped laser beam.

Moreover, according to the second embodiment, multiple places can be machined concurrently, thus improving the throughput in the manufacturing.

Moreover, according to the embodiment, the precise adjustment of the laser output or the like can be done at much less cost as compared with the conventional approach in order to secure a process margin, and thus application to the mass-production line is made easily.

In addition, the invention is not restricted to the contents of the above-mentioned embodiments, and various modifications can be implemented within the scope of the invention.

For example, in the above-described embodiments, although an ITO film on a glass substrate is listed as an example of the machined body, the machined body is not restricted to this. Furthermore, the machining is also not restricted to the removal of the thin film, and various other machining, such as cutting, drilling, texturing, and exposure of a photosensitive film, can be carried out.

Moreover, although in the first embodiment described above, the diffractive optical element and the focusing lens have been described as separate elements, for convenience, these functions may be integrated (superimposed) into a single element. Similarly, although in the second embodiment, the diffractive beam splitter and the focusing lens have been described as separate elements, for convenience, these functions may be integrated (superimposed) into a single element.

What is claimed is:

1. A laser-machining method, comprising:
   a first process in which a laser beam whose energy intensity distribution is a Gaussian distribution is generated;
   a second process in which the laser beam is shaped by applying a phase modulation based on a phase distribution expressed by a first order function having a negative gradient, the position in the direction of the beam diameter being the variable, with respect to the wavefront of the laser beam, so that the phase will relatively lead as coming closer to the center thereof and the phase will relatively lag as coming away from the center;
   a third process in which the laser beam is shaped by applying a phase modulation based on a phase distribution expressed by an n-th order function having a positive gradient (n is a natural number no less than 2), the position in the direction of the beam diameter being the variable, with respect to the wavefront of the laser beam that has been shaped through the second process, so that the phase will relatively lag as coming closer to the center thereof and the phase will relatively lead as coming away from the center; and
   a fourth process in which the laser beam, whose energy intensity distribution has been made substantially flat through the second and third process, is led to irradiate a machined body, thereby machining the machined body.

2. The laser-machining method according to claim 1, wherein the phase modulation in the second process is carried out using a diffractive optical element.

3. The laser-machining method according to claim 1, wherein the phase modulation in the third process is carried out using a focusing lens.

4. The laser-machining method according to claim 1, further comprising a fifth process in which the laser beam having gone through the second process is split into multiple beams, wherein in the fourth process each of the multiple laser beams is irradiated to the machined body, thereby machining multiple places of the machined body substantially simultaneously.

5. The laser-machining method according to claim 4, wherein the branching of the laser beam in the fifth process is carried out using a diffractive beam splitter.

6. The laser-machining method according to claim 5, wherein the diffractive beam splitter combines the function of carrying out the phase modulation in the second process.

7. A laser-machining device, comprising:
   a laser light source for generating a laser beam whose energy intensity distribution is a Gaussian distribution;
   a first optical element arranged in the path of the laser beam, that shapes the laser beam by applying a phase modulation based on a phase distribution expressed by a first order function having a negative gradient, the position in the direction of the beam diameter being the variable, with respect to the wavefront of the laser beam, so that the phase will relatively lead as coming closer to the center thereof and the phase will relatively lag as coming away from the center;
   a second optical element arranged in the path of the laser beam that has been shaped by the first optical element, that shapes the laser beam by applying a phase modulation based on a phase distribution expressed by an n-th order function having a positive gradient (n is a natural number no less than 2), the position in the direction of the beam diameter being the variable, with respect to the wavefront of the laser beam, so that the phase will relatively lag as coming closer to the center thereof and the phase will relatively lead as coming away from the center; and
   a positioning means that adjusts the relative arrangement of the machined body so that the laser beam, which has been shaped by the first and second optical elements and the energy intensity distribution of which has been made substantially flat, is led to irradiate a predetermined position of the machined body.

8. The laser-machining device according to claim 7, wherein the first optical element is a diffractive optical element.

9. The laser-machining device according to claim 7, wherein the second optical element is a focusing lens.

10. The laser-machining device according to claim 7, further comprising a third optical element that splits the laser beam, which has been shaped with the first optical element, into multiple beams, wherein each of the multiple laser beams is irradiated to the machined body, thereby machining multiple places of the machined body substantially simultaneously.

11. The laser-machining device according to claim 10, wherein the third optical element is a diffractive beam splitter.

12. The laser-machining device according to claim 11, wherein the diffractive beam splitter combines the function of the first optical element.

* * * * *